E. FRANKIGNOUL.
TUBING FOR BORING.
APPLICATION FILED APR. 25, 1911.
1,048,304.
Patented Dec. 24, 1912.
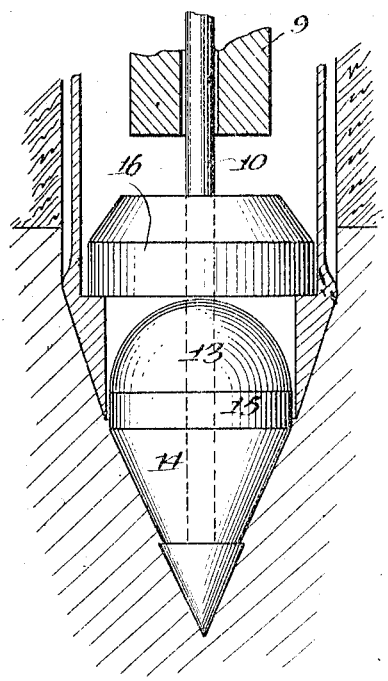
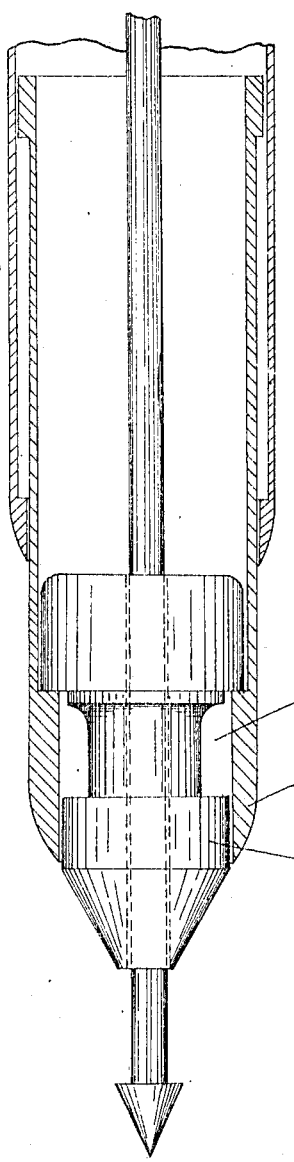
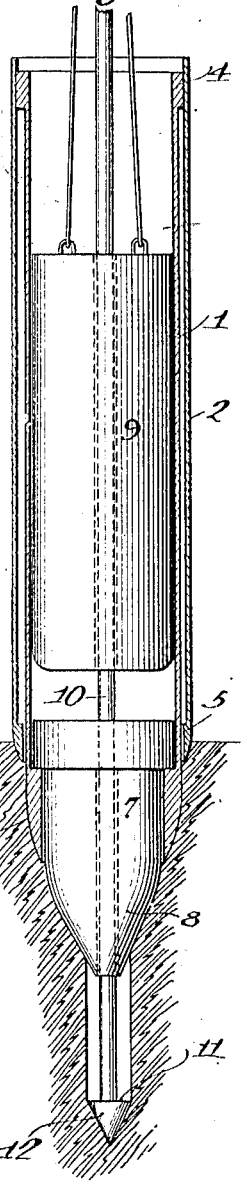
Witnesses:
Inventor
Edgard Frankignoul,
By D. Singer
Attorney.

UNITED STATES PATENT OFFICE.

EDGARD FRANKIGNOUL, OF LIEGE, BELGIUM.

TUBING FOR BORING.

1,048,304.   Specification of Letters Patent.   Patented Dec. 24, 1912.

Application filed April 25, 1911. Serial No. 623,138.

*To all whom it may concern:*

Be it known that I, EDGARD FRANKIGNOUL, a subject of the Kingdom of Belgium, residing at 62 Rue du St. Esprit, Liege, Belgium, have invented certain new and useful Improvements in Tubing for Boring; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

My invention relates to boring apparatus adapted to sink a hole in the soil by a succession of blows.

The object of my invention is to provide a system which will enable a hole to be driven down through soils of different characters, with high efficiency. It is particularly adapted for foundation work.

In the drawings, Figure 1 is a partial sectional view showing one form of my invention partly driven into the ground; and Figs. 2 and 3 are similar views showing other forms of the apparatus.

In the systems now in use, the main idea involved is the use of a tube with some sort of a point, either removable or not. This tube is used to sink a hole, and has been a necessity in order to keep the driving system in alinement.

The essential features of my invention lie in the use of a perforator or plug, through which extends a leading stem designed to advance ahead of the perforator during at least the first forming of the hole.

It also consists in this combination in connection with a hammer which operates on the perforator or plug to drive the plug along the leading stem after this stem has advanced ahead of the plug, and also to carry these parts along together in the later driving, if desirable.

The above parts may be used with or without casing or piping.

My system makes use of a tube only in soils where it is necessary to prevent the soil from falling into the hole. Where the tube is used in my system, it differs from existing systems in the following particulars:—1st. It forms no part of the driving system, because one cannot drive my tube independently of the driving plug. 2nd. No driving force is transmitted through the tube, which is merely drawn down along with the driving plug. 3rd. The tube does not even serve to keep the system in alinement, for this is done by the leading stem.

In the form of Fig. 1, 7 is the plug, which is shown as having a trunco-conical shape in its lower part 8 to facilitate entrance into the soil. This plug is provided with a central longitudinal hole through which extends a leading stem 10 having an enlarged pointed portion or head 12 at its lower end with a shoulder 11 between it and the stem. The plug is moved down along the stem by means of the hammer 9, which is raised and dropped in any desirable manner.

In the use of the apparatus, the plug 7 is slightly entered into the surface of the ground, and the leading stem is driven down into the ground a considerable distance ahead of the plug. During this action the stem is guided through the plug. When the leading stem head has been driven to the desired distance ahead of the plug, the weight 9 is then dropped over the leading stem to drive the plug 7 down through the ground until it reaches the head 12 of the leading stem. During this action the plug 7 of the rammer is guided by the stem. When the plug has reached the head of the leading stem, the stem may be again driven in advance, or the ramming with the weight 9 may be continued, as the sides of the hole or casing will guide the parts in the further movement.

In Fig. 1 I have shown the system as used with a series of telescoping pipe sections, such as 1 and 2, each inner section having an upper shoulder or flange 4 arranged to engage an internal flange 5 at the lower end of the next outer section so as to carry the telescoping sections one after the other downwardly as the plug is driven down. For this purpose I have shown the upper portion of the plug as enlarged and bearing on the shearing head 6 of the advance section 1. When it is desired to withdraw the plug, the rod 10 is raised, and the shoulder on the head of the leading stem will lift the plug with it.

In Fig. 2 I show a form similar to that of Fig. 1, excepting that the plug is formed in two parts 13 and 14 with an intermediate layer between them of expansible material. In this case, the driving member is shown at 16, this bearing on the upper section 13 of the plug and being actuated by rammer 9. The leading stem 10 is similar to that shown in the first form. The expansible washer portion 15 may be formed of leather, wood, lead, &c., and will expand laterally under the blows and contact with the inner wall of the leading pipe section to keep out water or earthy material. The feature of the compressible packing in this figure is not claimed herein, as I have filed a divisional application thereon, No. 636,502, filing date July 1st, 1911.

In Fig. 3 I show a form similar to that of Fig. 1, except that a special annular space 17 is provided in the length of the plug to form a cavity for the reception of earthy matter which may pass up inside of the shearing portion 6 and the lower portion 7' of the plug. In this case the same leading stem is shown as in the previous cases. This cavity portion, of course, is provided between the plug and the inner wall of the leading pipe section, and preferably between it and the shearing head of this wall.

My system may be used with or without surrounding tubing, although I prefer to use it with such tubing.

Many changes may be made in the form and arrangement of the plug, the leading stem, &c., without departing from my invention.

I claim:—

1. A boring apparatus, comprising a driving tapered plug having a longitudinal hole, a leading stem extending slidably through said hole, and a rammer arranged to surround the stem and act upon the plug; substantially as described.

2. A boring apparatus, comprising a plug having a longitudinal hole, a leading stem extending loosely through the hole and having an enlarged point, and a rammer having a hole to receive the leading stem and movable thereover; substantially as described.

3. A tubular boring apparatus, comprising a casing having a lower inner shoulder, a tapered plug having an enlarged portion engaging the said shoulder, the plug having a longitudinal hole, a leading stem extending through the hole, and a rammer arranged to surround the leading stem; substantially as described.

4. A tubular boring apparatus, comprising a casing section having a lower inner shoulder, and a plug having an upper portion arranged to engage said shoulder, the casing and plug having an intermediate cavity between them to receive any matter working up between the plug and the lower end portion of the casing; substantially as described.

5. In tubular boring apparatus, a tubular shearing member, a plug arranged to move within the same, the plug and shearing member having an annular cavity between them, and a leading stem extending through the plug; substantially as described.

6. A tubular boring apparatus comprising in combination, a tube adapted to be sunk into the earth and provided with a lower shearing edge, and an internal shoulder arranged above said edge, a tapering plug having a portion closely fitting said tube adjacent the shearing edge thereof, a portion for engaging said internal shoulder, and a reduced portion projecting upwardly toward said shoulder, a ram for striking said member to sink the apparatus, and a guide rod extending through said plug member and ram and having a pointed portion adapted to be disposed in advance of said plug; substantially as described.

In testimony whereof I affix my signature in presence of two witnesses.

EDGARD FRANKIGNOUL.

Witnesses:
  GEORGES VANDER HAEYHEN,
  LEONARD LÉVA.